US012590544B2

(12) United States Patent
Kray et al.

(10) Patent No.: US 12,590,544 B2
(45) Date of Patent: Mar. 31, 2026

(54) COMPOSITE AIRFOIL

(71) Applicant: General Electric Company, Schenectady, NY (US)

(72) Inventors: Nicholas Joseph Kray, Mason, OH (US); Arthur William Sibbach, Boxford, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 194 days.

(21) Appl. No.: 18/525,121

(22) Filed: Nov. 30, 2023

(65) Prior Publication Data

US 2025/0327408 A1 Oct. 23, 2025

(51) Int. Cl.
*F01D 5/28* (2006.01)

(52) U.S. Cl.
CPC ........ *F01D 5/282* (2013.01); *F05D 2300/603* (2013.01)

(58) Field of Classification Search
CPC .................................. F01D 5/282; F01D 5/28
See application file for complete search history.

(56) References Cited

U.S. PATENT DOCUMENTS 7,247,002 B2 7/2007 Albrecht et al.
7,306,826 B2 * 12/2007 Subramanian .......... F01D 5/284 427/249.4
7,758,313 B2 7/2010 Eyb
8,105,042 B2 1/2012 Parkin et al.
8,419,374 B2 * 4/2013 Huth .................... B29C 70/865 416/224
8,573,947 B2 11/2013 Klinetob et al.
8,696,319 B2 4/2014 Naik
9,249,530 B2 2/2016 Yoon et al.
9,488,056 B2 11/2016 Nagle et al.
10,099,434 B2 10/2018 Anderson
10,450,870 B2 * 10/2019 Nandula .................. F02C 3/06
10,519,576 B2 12/2019 Marchal et al.
10,724,159 B2 7/2020 Marchal et al.
10,830,062 B2 11/2020 Paquin
11,015,461 B2 5/2021 Sakala et al.
11,040,465 B2 6/2021 Guivarc'h et al.
11,427,687 B2 8/2022 Glynn et al.

FOREIGN PATENT DOCUMENTS

EP 3543467 A1 9/2019

OTHER PUBLICATIONS https://www.rockwestcomposites.com/on/demandware.static/Sites-RWC-Site/Sites-rwc-master-catalog/-/wysiwyg/AS4.pdf?srsltid=AfmBOoqyCi_99ZI597iNTo8hSakzpNiEPn3tySQfHdPDtGh4WJ6HUbaM, HexTow AS4 (Year: 2010).*
PE (Low/Medium Density, Linear Copolymer) (Year: 2008).*

* cited by examiner

*Primary Examiner* — Michael L Sehn
(74) *Attorney, Agent, or Firm* — Venable LLP; Andrew W. Bradhaw; Michele V. Frank

(57) ABSTRACT

A composite airfoil comprising an airfoil portion and a composite ply. The airfoil portion has an outer wall extending between a root and a tip, and between a leading edge and a trailing edge. The composite ply has a first set of fibers and a second set of fibers. Each fiber of the first set of fibers along a first centerline axis. Each fiber of the second set of fibers extends along a second centerline axis.

20 Claims, 5 Drawing Sheets

COMPOSITE AIRFOIL

TECHNICAL FIELD

The disclosure generally relates to an airfoil, and more specifically to a composite airfoil having a composite ply.

BACKGROUND

Turbine engines, and particularly gas or combustion turbine engines, are rotary engines that extract energy from a flow of gases passing through a fan with a plurality of fan blades, then into the engine through a series of compressor stages, which include pairs of rotating blades and stationary vanes, through a combustor, and then through a series of turbine stages, which include pairs of rotating blades and stationary vanes. The blades are mounted to rotating disks, while the vanes are mounted to stator disks.

Some components of the turbine engine can include composite materials. Composite materials typically include a fiber-reinforced matrix and exhibit a high strength-to-weight ratio. Due to the high strength-to-weight ratio and moldability to adopt relatively complex shapes, composite materials are utilized in various applications, such as a turbine engine or an aircraft. Composite materials can be, for example, installed on or define a portion of the fuselage, or wings, rudder, manifold, airfoil, or other components of the aircraft or turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DESCRIPTION OF EMBODIMENTS OF THE INVENTION

Figure 1:
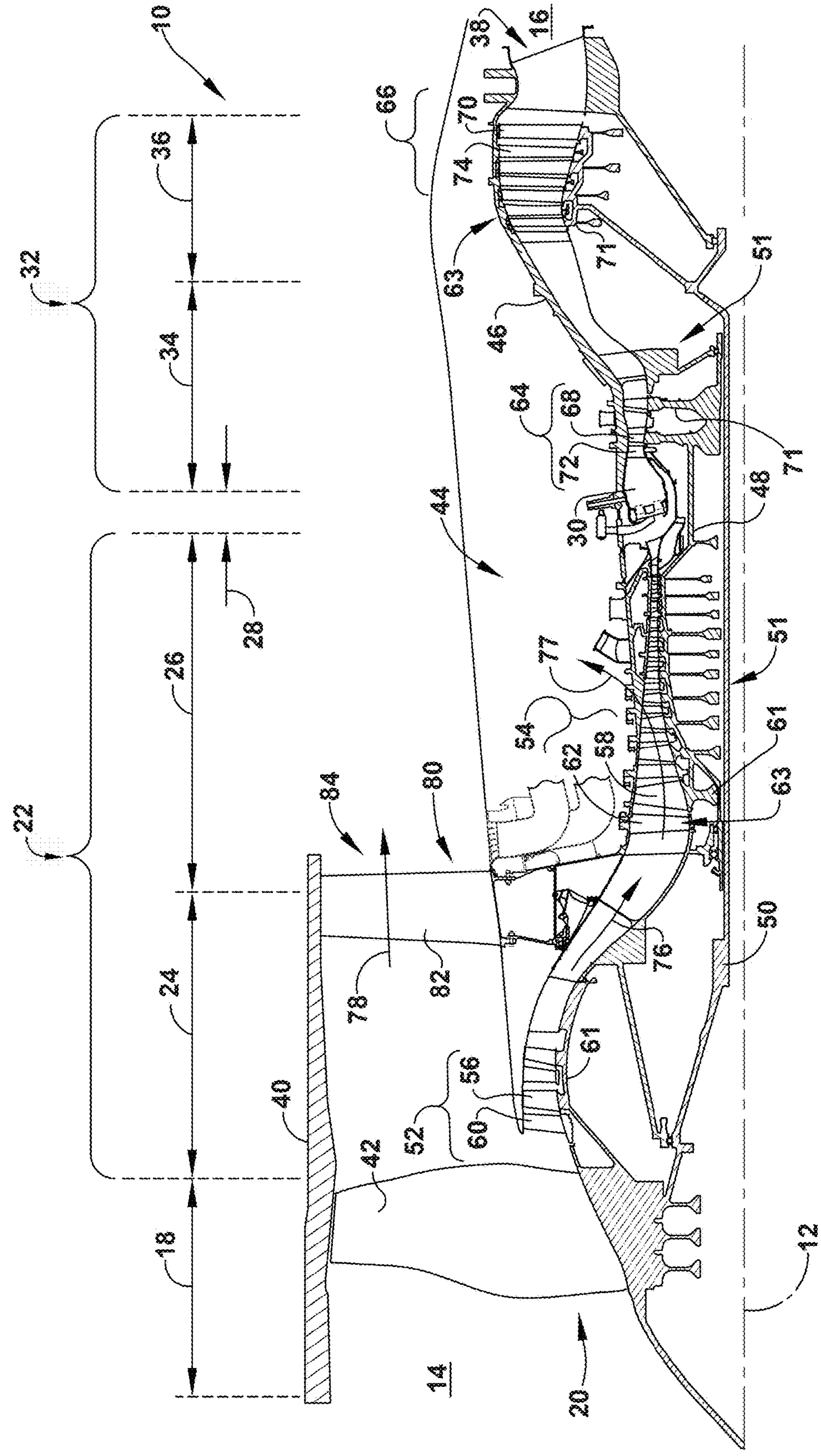
FIG. 1 is a schematic cross-sectional view of a turbine engine in accordance with an exemplary embodiment of the present disclosure.

Aspects of the disclosure herein are directed to a composite airfoil including one or more composite plies. A composite ply includes one or more tows of fibers. As used herein, a tow refers to a bundle of continuous filaments or fibers, with each fiber in the tow having and extending along a respective centerline axis. The composite ply can include, for example, a first tow and a second tow interwoven with the first tow. The first tow and the second tow can have differing bulk moduli. For purposes of illustration, the present disclosure will be described with respect to the composite airfoil being provided within a turbine engine. It will be understood, however, that aspects of the disclosure described herein are not so limited and can have general applicability within other engines or within other portions of the turbine engine. For example, the disclosure can have applicability for a rotatable disk, seal cartridge, and blade in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

As used herein, the term "bulk modulus" is in reference to a measure of the ability of a substance to withstand changes in volume when under compression on all sides. The bulk modulus is a function of the initial volume of the substance, and a derivative of pressure with respect to volume.

Further yet, as used herein, the term "fluid" or iterations thereof can refer to any suitable fluid within the gas turbine engine wherein at least a portion of the gas turbine engine is exposed to such as, but not limited to, combustion gases, ambient air, pressurized airflow, working airflow, or any combination thereof. It is yet further contemplated that the gas turbine engine can be other suitable turbine engines such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The term "composite," as used herein is, is indicative of a component having two or more materials. A composite can be a combination of at least two or more metallic, non-metallic, or a combination of metallic and non-metallic elements or materials. Examples of a composite material can be, but are not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components that would benefit from the lighter-weight and higher temperature capability these materials can offer.

The term "metallic" as used herein is indicative of a material that includes metal such as, but not limited to, titanium, iron, aluminum, stainless steel, and nickel alloys. A metallic material or alloy can be a combination of at least two or more elements or materials, where at least one is a metal.

FIG. 1 is a schematic cross-sectional diagram of a turbine engine 10 for an aircraft. The turbine engine 10 has a generally longitudinally extending axis or centerline 12 extending forward 14 to aft 16. The turbine engine 10 includes, in a downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including an HP turbine 34, and an LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft 48 is disposed coaxially about the engine centerline 12 of the turbine engine 10 and drivingly connects the HP turbine 34 to the HP compressor 26. An LP shaft 50, which is disposed coaxially about the engine centerline 12 of the turbine engine 10 within the larger diameter annular HP shaft 48, drivingly connects the LP turbine 36 to the LP compressor 24 and fan 20. The shafts 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outward relative to the engine centerline 12, from a blade platform to a tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor 24, 26 can be mounted to (or integral to) a disk 61, which is mounted to the corresponding one of the HP and LP shafts 48, 50. The static compressor vanes 60, 62 for a stage of the compressor 24, 26 can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outward relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP shafts 48, 50. The turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

It will be appreciated that the turbine engine 10 can be split into at last two separate portions: a rotor portion and a stator portion. The rotor portion can be defined as any portion of the turbine engine 10 that rotates about a respective rotational axis. The stator portion can be defined by a combination of non-rotating elements provided within the turbine engine 10. As a non-limiting example, the rotor portion can include one or more of the plurality of fan blades 42, the compressor blades 56, 58, or the turbine blades 68, 70. As a non-limiting example, the stator portion can include one or more of the plurality of airfoil guide vanes 82 (described below), the static compressor vanes 60, 62, or the static turbine vanes 72, 74.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP shaft 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components for cooling. The temperature of pressurized airflow 76 entering the combustor 30 is significantly increased above the bleed air temperature. The bleed air 77 may be used to reduce the temperature of the core components downstream of the combustor 30. The bleed air 77 can also be utilized by other systems.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

A remaining portion of the airflow exiting the fan section 18, referred to as a bypass airflow 78, bypasses the LP compressor 24 and engine core 44 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert at least some directional control of the bypass airflow 78.

The turbine engine 10, as illustrated, is a turbofan engine. It will be appreciated, however, that the turbine engine 10 can be any suitable engine such as, but not limited to, a turboprop engine, a turboshaft engine, a ducted turbofan engine, an unducted engine, or an open rotor turbine engine. As a non-limiting example, the turbine engine 10 can be an unducted turbine engine. The unducted turbine engine includes a set of external fan blades and external fan vanes that extend radially outward from a nacelle or exterior casing that houses the engine core. The external fan blades and the external fan fanes are similar in function with respect to the fan blades 42 and airfoil guide vanes 82, respectively, of the turbine engine 10. It will be appreciated that at least a portion of the external fan blades or the external vane blades can define a radial extreme (e.g., a radially farthest portion from the engine centerline 12) in an unducted turbine engine. In other words, no portion of the turbine engine is provided radially outward from the external fan blades or external fan vanes in an unducted turbine engine.

Figure 2:
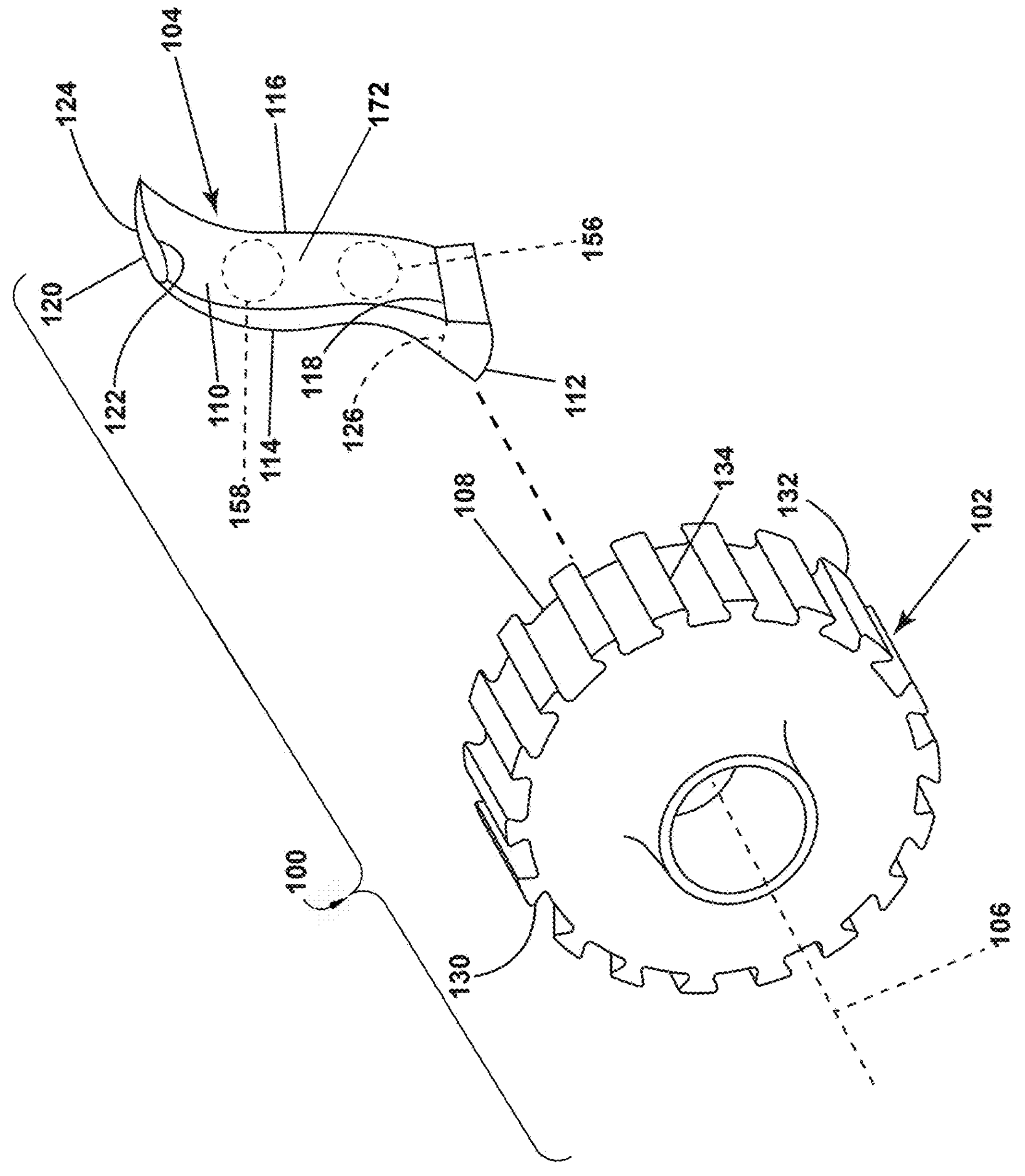
FIG. 2 is a schematic perspective view of an assembly suitable for use within the turbine engine of FIG. 1, the assembly comprising a rotatable disk and a composite airfoil, the composite airfoil having a first and a second region.

FIG. 2 is a schematic perspective view of an assembly 100 including a rotatable disk 102 and a composite airfoil 104 suitable for use within the turbine engine 10 of FIG. 1. The rotatable disk 102 is suitable for use as the rotatable disk 61, 71 (FIG. 1) or any other disk such as, but not limited to, a disk within the fan section 18 (FIG. 1) of the turbine engine 10 (FIG. 1). The rotatable disk 102 is rotatable about a rotational axis 106 that can coincide with or be offset from the engine centerline (e.g., the engine centerline 12 of FIG. 1).

The rotatable disk 102 includes a forward surface 130 and an aft surface 132 with a peripheral surface 134 interconnecting the forward surface 130 and the aft surface 132. A plurality of slots 108 extend axially along the peripheral surface 134 between the forward surface 130 and the aft surface 132. Each slot of the plurality of slots 108 extends radially inward from the peripheral surface 134 towards the rotational axis 106. Each slot of the plurality of slots 108 extends a total circumferential distance that is less than a total axial distance that the slot extends along the peripheral surface 134.

The composite airfoil 104 includes an airfoil portion 110 and a dovetail portion 112 extending from the airfoil portion 110. For purposes of illustration, a transition 126 between the dovetail portion 112 and the airfoil portion 110 has been illustrated in phantom lines. The dovetail portion 112 can define a portion of the composite airfoil 104 that flares circumferentially outward from the airfoil portion 110. The dovetail portion 112 defines a portion of the composite airfoil 104 receivable within a respective slot of the plurality of slots 108.

The airfoil portion 110 includes an outer wall 172. The outer wall 172 extends between a leading edge 114 and a trailing edge 116 to define a chord-wise direction. The composite airfoil 104 extends between a root 118 and a tip 120 to define a span-wise direction. The dovetail portion 112 terminates radially at the root 118. The airfoil portion 110 includes a pressure side 122 and a suction side 124.

The composite airfoil 104 is coupled to the rotatable disk 102 by inserting the composite airfoil 104, specifically the dovetail portion 112, into a respective slot of the plurality of slots 108. Once the airfoil 104 is inserted, the airfoil portion 110 extends radially outward from the peripheral surface 134. The composite airfoil 104 is held in place by frictional contact with the slot 108 or can be coupled to the slot 108 via any suitable coupling method such as, but not limited to, welding, adhesion, fastening, or the like. While only a single composite airfoil 104 is illustrated, it will be appreciated that there can be any number of one or more composite airfoils 104 in the assembly 100. As a non-limiting example, the total number of composite airfoils 104 can correspond to the total number of slots in the plurality of slots 108.

The composite airfoil 104 can include a composite material. By way of non-limiting example, the composite airfoil 104 can include at least a PMC portion, a polymeric portion, or both. The PMC can include, but is not limited to, a matrix of thermoset (epoxies, phenolics) or thermoplastic (polycarbonate, polyvinylchloride, nylon, acrylics) and embedded glass, carbon, steel, or a combination thereof. It will be appreciated that the airfoil portion 110 can include a composite material, a metallic material, any other suitable material, or a combination thereof.

The composite airfoil 104 can be broken up into regions. As a non-limiting example, the composite airfoil 104 can include a first region 156 and a second region 158. The first region 156 is in a separate area from the second region 158. The first region 156 and the second region 158 each include a composite material.

The composite airfoil 104 can include any number of one more regions. The first region 156 and the second region 158 are used for illustrative purposes only. As a non-limiting example, the composite airfoil 104 can include a third region. The first region 156, the second region 158, or any other region of the composite airfoil 104 can be provided along any portion of the composite airfoil 104. As a non-limiting example, the first region 156 can be provided along the dovetail portion 112, while the second region 158 can be provided along the airfoil portion 110. As a non-limiting example, the first region 156 can be provided along the dovetail portion 112, while the second region 158 can be provided along the leading edge 114. The placement of the first region 156, the second region 158, or any other region can be localized along a thickness of the composite airfoil 104. As a non-limiting example, the first region 156 can be provided along the outer wall 172 while the second region

158 can be provided within an interior of the composite airfoil 104. As a non-limiting example, the second region 158 can be overlaid by the first region 156. As a non-limiting example, the second region 158 can form a portion of a core (not illustrated) of the composite airfoil 104 that is encased by the outer wall 172, and the outer wall 172 can be at least partially defined by the first region 156.

While described as the composite airfoil 104 being mounted to the rotatable disk 102, it will be appreciated that the composite airfoil 104 can be any suitable static or rotating airfoil. In terms of the former, the composite airfoil 104 can be mounted to a static body, as opposed to the rotatable disk 102. As such, the composite airfoil 104 can be at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42. In the instance where the composite airfoil 104 is mounted to a stationary component of the turbine engine 10 (FIG. 1), the body identified by the rotatable disk 102 can be any suitable stationary portion of the turbine engine 10 (FIG. 1) that the composite airfoil 104 is couplable to, such as, but not limited to, a band, a shroud, a casing, or the like.

Figure 3:
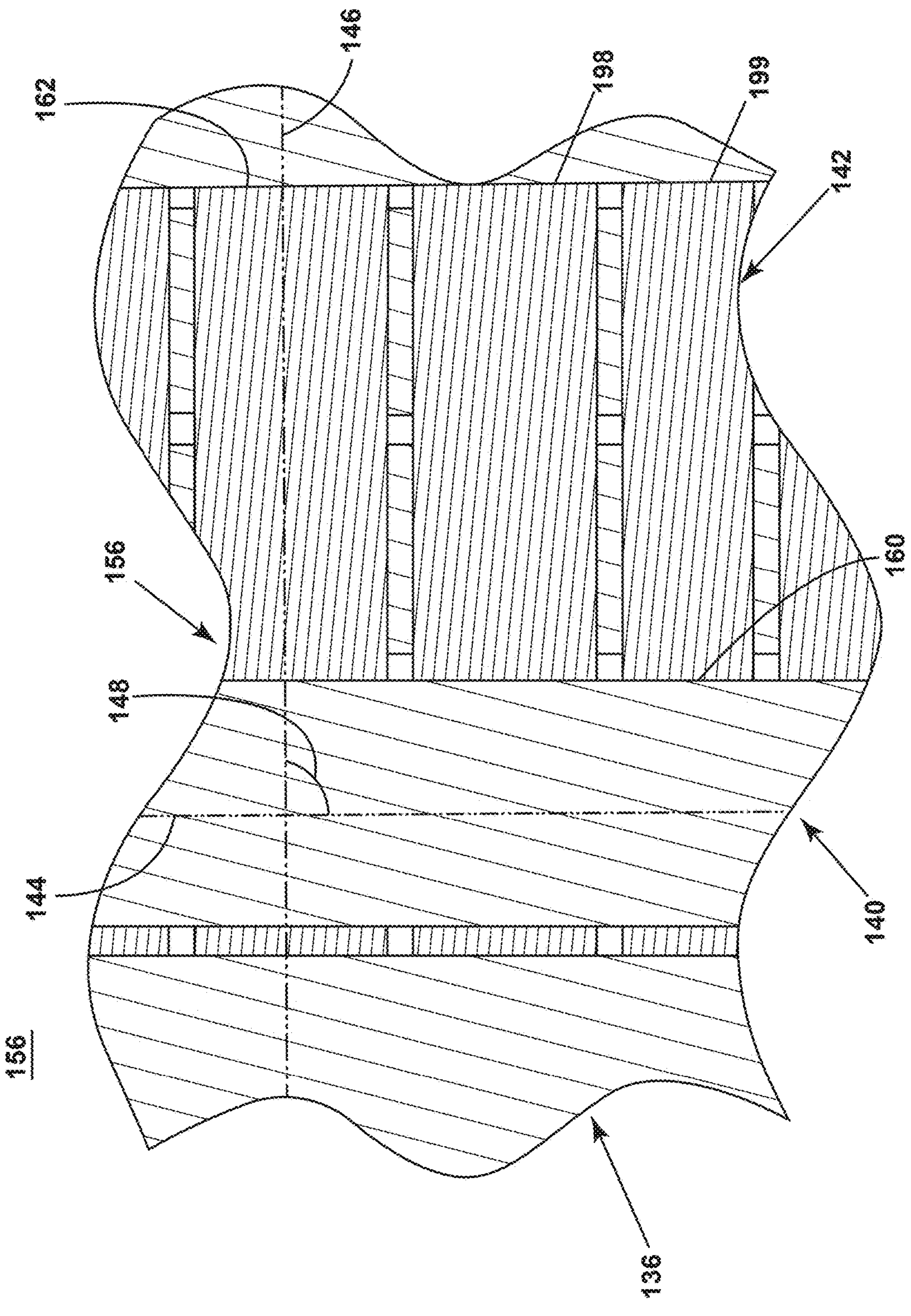
FIG. 3 is a schematic planform view of the first region of FIG. 2, further illustrating a first composite ply.

FIG. 3 is a schematic planform view of the first region 156 of FIG. 2. The first region 156 includes a first composite ply 136. The first composite ply 136 can include any number of one or more tows. As a non-limiting example, the first composite ply 136 includes a first tow 140 and a second tow 142.

The first tow 140 includes a first set of fibers 160. The second tow 142 includes a second set of fibers 162. The first set of fibers 160 is interwoven (e.g. woven or braided) with the second set of fibers 162. As a non-limiting example, fibers of the first set of fibers 160 and the second set of fibers 162 can include a respective patterns in which the fibers are interwoven with an other of the first set of fibers 160 or the second set of fibers 162. Each fiber of the first set of fibers 160 includes a pattern, from right to left, of extending over or under respective fibers of th second set of fibers 162. As a non-limiting example, a first fiber of the first set of fibers 160 can extend over two adjacent second fibers of the second set of fibers 162, under the next second fiber of the second set of fibers 162, and over the next second fiber of the second set of fibers 162. The first set of fibers 160 and the second set of fibers 162 can include any suitable patterns that may or may not be the same between the first and second sets of fibers 160, 162.

Each fiber of the first set of fibers 160 includes a first centerline axis 144 (of which only one is indicated). Each fiber of the second set of fibers 162 includes a second centerline axis 146 (of which only one is indicated). The first set of fibers 160 are angled with respect to the second set of fibers 162 such that the first centerline axis 144 intersects the second centerline axis 146 at a first included angle 148. The first included angle 148 can include an absolute value of greater than 0 degrees and less than 180 degrees. As a non-limiting example, the first included angle 148 can include an absolute value of greater than or equal to 5 degrees and less than or equal to 60 degrees.

The first tow 140 can have a varying construction from the second tow 142. As used herein, a construction refers to at least one of a number of fibers, a material property of the set of fibers within the composite ply, or a combination thereof. As a non-limiting example, the first set of fibers 160 can include a first bulk modulus, and the second set of fibers 162 can include a second bulk modulus, different from the first bulk modulus. As a non-limiting example, the first bulk modulus, and the second bulk modulus can each be greater than 5% different from each other. A singular tow of the first composite ply 136 can include varying bulk modulus within the respective set of fibers making up the singular tow. As a non-limiting example, the second set of fibers 162 can include a first fiber 198 and a second fiber 199. The first fiber 198 can have the second bulk modulus. The second fiber 199 can have a bulk modulus that is non-equal to the second bulk modulus. As such, it will be appreciated that at least a portion of the first set of fibers 160 can include a first bulk modulus, and that at least a portion of the second set of fibers 162 can include a second bulk modulus.

It will be appreciated that the first set of fibers 160, the second set of fibers 162, or any other number of additional sets of fibers can be provided within a singular tow. As a non-limiting example, the first set of fibers 160 including a plurality of fibers all formed as the first fiber 198, the second set of fibers 162 including a plurality of fibers all formed as the second fiber 199. In other words, the first set of fibers 160 can include a plurality of fibers having the first bulk modulus, while the second set of fibers 162 can include a plurality of fibers having the second b bulk modulus, different from the first bulk modulus. The first set of fibers 160 can be alternately spaced with respect to the second set of fibers 162 such that an alternating pattern of first fibers 198 and second fibers 199 is created along the singular tow. Alternatively, the first set of fibers 160 and the second set of fibers 162 can be non-alternately spaced such that pockets of two or more adjacent first fibers 198 or two or more second fibers 199 is created in the singular tow.

Figure 4:
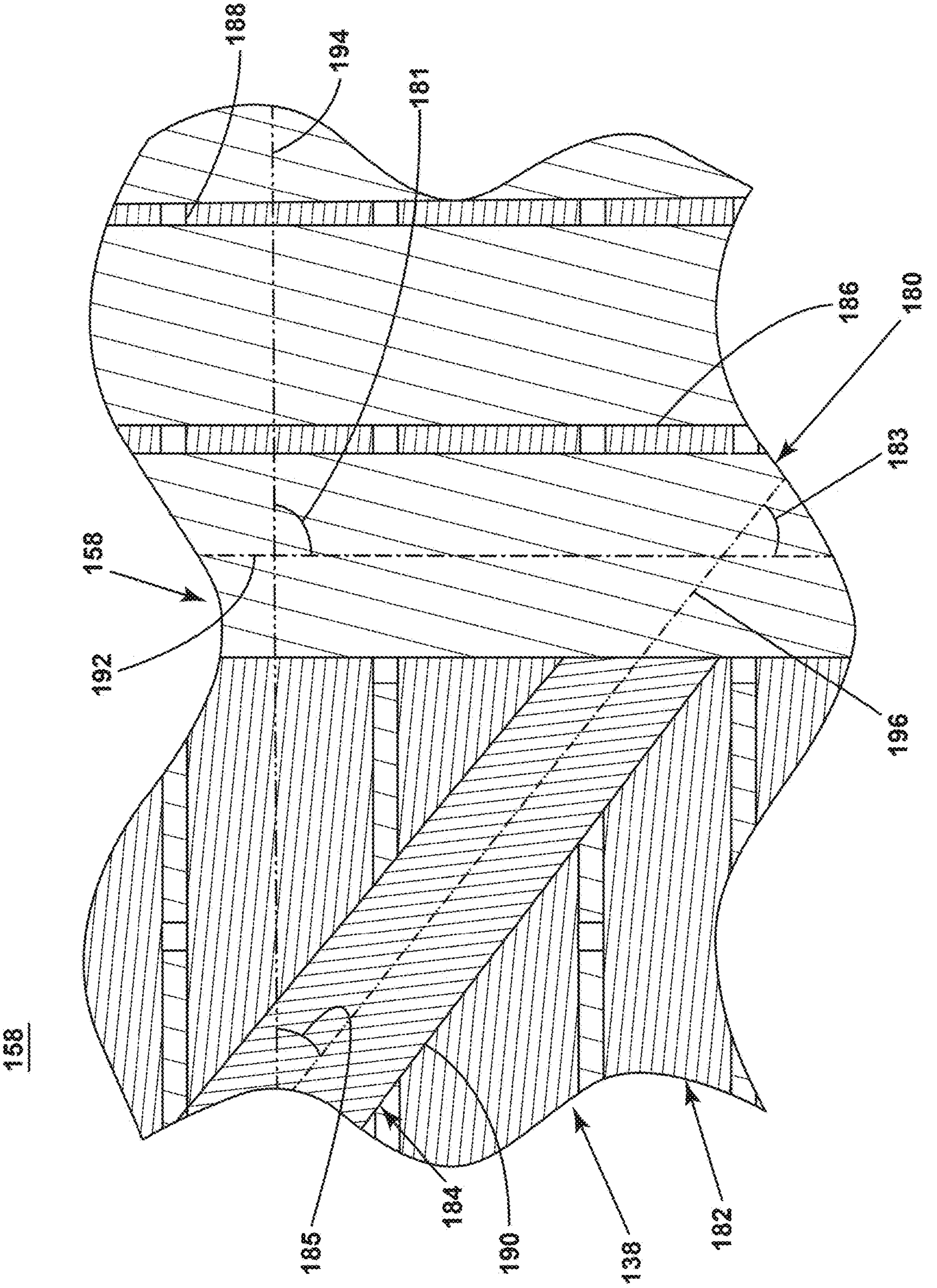
FIG. 4 is a schematic planform view of the second region of FIG. 2, further illustrating a second composite ply.

FIG. 4 is a schematic planform view of the second region 158 of FIG. 2. The second region can include a second composite ply 138. The second composite ply 138 can include any number of one or more tows. As a non-limiting example, the second composite ply 138 can include a third tow 180, a fourth tow 182, and a fifth tow 184.

The third tow 180 includes a third set of fibers 186. The fourth tow 182 includes a fourth set of fibers 188. The fifth tow 184 includes a fifth set of fibers 190. The third set of fibers 186, the fourth set of fibers 188, and the fifth set of fibers 190 are interwoven (e.g. woven or braided) with each other. The third set of fibers 186, the fourth set of fibers 188, and the fifth set of fibers 190 can include any suitable pattern with respect to one another. Each fiber of the third set of fibers 186 extends along a third centerline axis 192. Each fiber of the fourth set of fibers 188 extends along a fourth centerline axis 194. Each fiber of the fifth set of fibers 190 extends along a fifth centerline axis 196.

The third set of fibers 186 are non-parallel to the fourth set of fibers 188 such that a second included angle 181 is formed between the third centerline axis 192 and the fourth centerline axis 194. The third set of fibers 186 are non-parallel to the fifth set of fibers 190 such that a third included angle 183 is formed between the third centerline axis 192 and the fifth centerline axis 196. The fifth set of fibers 190 are non-parallel to the fourth set of fibers 188 such that a fourth included angle 185 is formed between the fifth centerline axis 196 and the fourth centerline axis 194. A value of the second included angle 181, the third included angle 183 and the fourth included angle 185 can all be non-equal to each other. As a non-limiting example, the second included angle 181, the third included angle 183 and the fourth included angle 185 can each include an absolute value of greater than 0 degrees and less than 180 degrees. As a non-limiting example, the second included angle 181, the third included angle 183 and the fourth included angle 185 can each include an absolute value of greater than or equal to 5 degrees and less than or equal to 60 degrees.

The third tow 180, the fourth tow 182 and the fifth tow 184 can all have varying constructions with respect to one another. As a non-limiting example, the third set of fibers 186 can have a third bulk modulus, the fourth set of fibers 188 can have a fourth bulk modulus, and the fifth set of fibers 190 can have a fifth bulk modulus. The third bulk modulus, the fourth bulk modulus, and the fifth bulk modulus can be non-equal. As a non-limiting example, the third bulk modulus, the fourth bulk modulus, and the fifth bulk modulus can each be greater than 5% different from each other. As a non-limiting example, the first bulk modulus can be greater than 1.05 or less than 0.95 times the second bulk modulus. Like the first composite ply 136 (FIG. 3), a singular tow of the second composite ply 138 can include varying bulk modulus within the respective set of fibers making up the singular tow. As such, it will be appreciated that at least a portion of the third set of fibers 186 can have a third bulk modulus, at least a portion of the fourth set of fibers 188 can have a fourth bulk modulus, and at least a portion of the fifth set of fibers 190 can have a fifth bulk modulus.

With reference to both FIGS. 3 and 4, the first composite ply 136 has a different construction from the second composite ply 138. As a non-limiting example, the first composite ply 136 can have a varying number of tows, bulk modulus of fibers, angling of fibers, material property, or a combination thereof. At least a portion of the second composite ply 138 can be a continuation of the first composite ply 136. As a non-limiting example, the third tow 180 and the fourth tow 182 can be the first tow 140 and the second tow 142, respectively, but extended to the second region 158. As a non-limiting example, the varying construction can be the inclusion of the fifth tow 184 in the second region 158. As a non-limiting example, the varying construction can be that the bulk modulus of the first tow 140 has a different bulk modulus from the third tow 180. The first composite ply 136 can be separate from the second composite ply 138. In other words, the first composite ply 136 and the second composite ply 138 can be formed as completely separate composite plies that do not share fibers or tows.

With reference to FIG. 2, the composite airfoil 104 can include any number of one more regions, with each region including a respective composite ply, some or all of which may have a different constructions (e.g., number of tows, material, bulk moduli, etc.) than the other composite plies in the other regions. The composite airfoil 104 can include any number of one or more composite plies, some or all of which may have a different constructions (e.g., number of tows, material, bulk moduli, etc.) than the other composite plies in the other regions.

During operation, the composite airfoil 104 rotates about the rotational axis 106. A force caused by at least one of a flow of air flowing over the composite airfoil 104, the rotation of the composite airfoil 104, an external force, or a combination thereof, can be experienced along the composite airfoil 104. The force experienced along the composite airfoil 104 can be larger or in differing directions between regions of the composite airfoil 104. As a non-limiting example, the dovetail portion 112 can experience relatively large circumferential forces due to the rotation of the rotatable disk 102 and the contact of the rotatable disk 102 and the composite airfoil 104, while the leading edge 114 of the composite airfoil 104 can experience relatively large axial forces due to an oncoming working airflow flowing from the leading edge 114 to the trailing edge 116.

With additional reference to FIGS. 3 and 4, it is contemplated that the variation between the first composite ply 136, the second composite ply 138, and any other composite ply of the composite airfoil 104 can be provided based on the anticipated forces that will be experienced at a given region of the composite airfoil 104. As a non-limiting example, a composite ply including tows braided together can be provided at the leading edge 114, while a laminar tow (all fibers extending in a single direction) or a composite ply including two or more interwoven tows can be provided along the trailing edge 116.

Adjusting the bulk modulus between fibers of a respective tow (e.g., the first fiber 198 and the second fiber 199) is used to better accommodate for the anticipated forces that will be experienced along the composite airfoil 104. As a non-limiting example, if a single ply is expected to experience a first force at a first location and a second force, different from the first force, at a second location, the bulk modulus of the tows or the fibers within the tows can be varied to accommodate for the first force and the second force. As a non-limiting example, a ply includes only the first set of fibers 160, a first fiber with a first bulk modulus, and a second fiber with a second bulk modulus, different from the first bulk modulus. The first fiber can be better adapted to accommodate for the first force, while the second fiber can be better adapted to accommodate for the second force. As such, the first fiber can be placed in a location along the tow where the first force is anticipated, while the second fiber can be placed in a location along of the tow where the second force is anticipated.

During manufacture of the composite airfoil 104, the composite plies (e.g., the first composite ply 136, the second composite ply 138, etc.) can be formed and subsequently placed through any suitable method. As a non-limiting example, each individual tow can be formed by manually or automatically placing and then bonding individual fibers together. As a non-limiting example, tows of fibers can be automatically or manually interwoven with other tows of fibers. As a non-limiting example, a composite ply can be automatically or manually placed along a respective portion of the composite airfoil 104. Manual placement or forming can be done through human manufacturing methods, while automatic placement of forming can be done through automatic fiber placement (AFP) manufacturing methods. As used herein, AFP manufacture methods refer to any suitable method of physically placing fibers automatically without direct human intervention. As a non-limiting example, an AFP manufacturing method can include the placement of plies along the composite airfoil 104 through robotics. As used herein, human manufacturing methods refer to any suitable method of manually placing a ply along the composite airfoil 104 with direct human intervention. As a non-limiting example, a human can pick up and place a ply along the composite airfoil 104 during the human manufacturing process.

Figure 5:
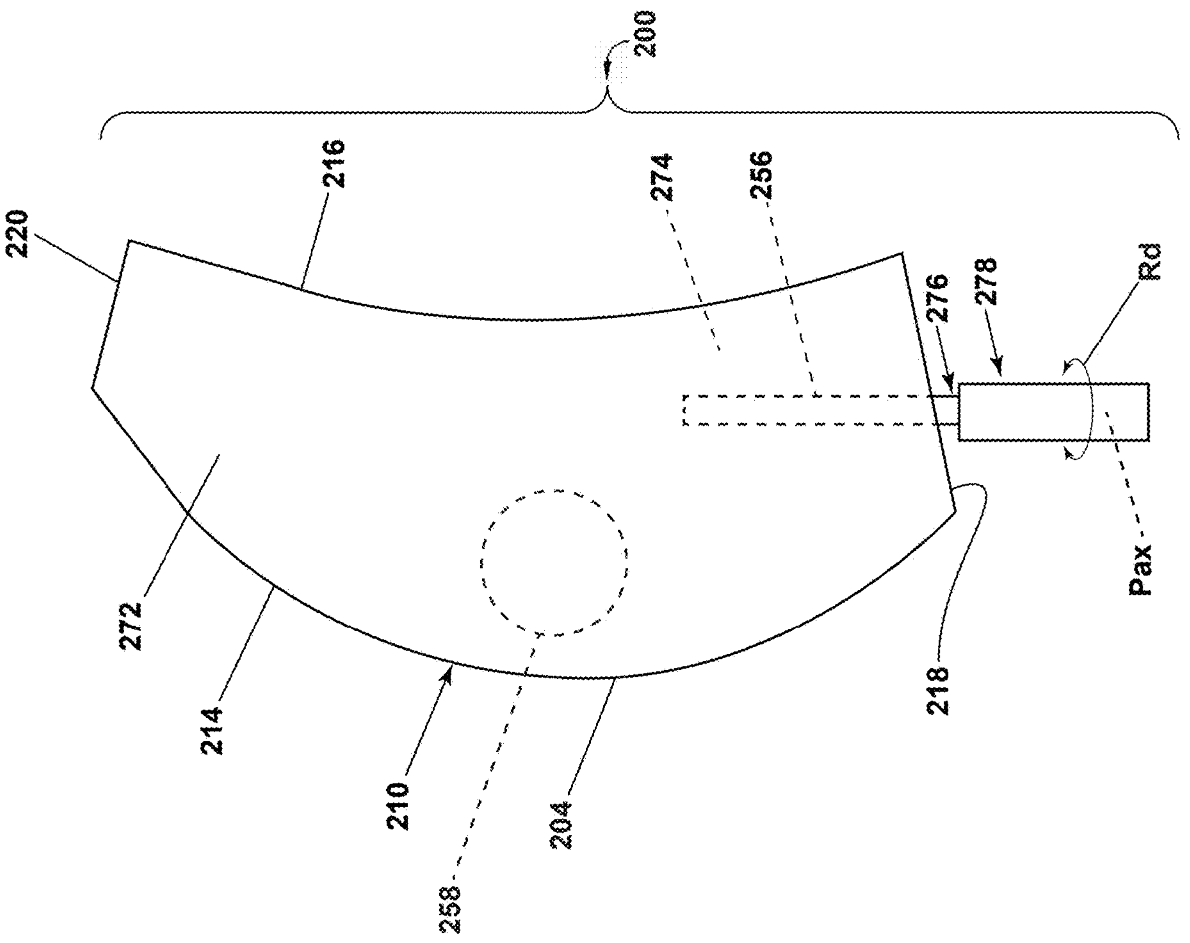
FIG. 5 is a schematic side view of an exemplary assembly for use within the turbine engine of FIG. 1, the assembly including a spar and a trunnion.

FIG. 5 is a schematic side-view of an exemplary assembly 200 suitable for use within the turbine engine 10 of FIG. 1. The assembly 200 is similar to the assembly 100; therefore, like parts will be identified with like numerals increased to the 200 series with it being understood that the description of the assembly 100 applies to the assembly 200 unless noted otherwise.

The assembly 200 includes a composite airfoil 204. The composite airfoil 204 includes an airfoil portion 210. The airfoil portion 210 includes an outer wall 272 extending between a leading edge 214, a trailing edge 216, a root 218, and a tip 220. The airfoil portion 210 includes an interior 274. It is contemplated that the composite airfoil 204 can be a blade, vane, airfoil, or other component of any turbine engine, such as, but not limited to, a gas turbine engine, a turboprop engine, a turboshaft engine, a ducted turbofan engine, an unducted turbofan engine, or an open rotor turbine engine. The outer wall 272 can be a composite wall made of one or more layers of composite material. The one or more layers of material can be applied during the same stage or different stages of the manufacturing of the composite airfoil 204.

The composite airfoil 204 is similar to the composite airfoil 104 in that the composite airfoil 204 includes a first region 256 and a second region 258 having respectively composite plies (e.g., the first composite ply 136 and the second composite ply 138 of FIG. 3) with differing construction. The composite airfoil 204, however, does not include a dovetail portion (e.g., the dovetail portion 112 of FIG. 2). The assembly 200 instead includes a spar 276 extending outwardly from the root 218 of the airfoil portion 210. The assembly 200 further includes a trunnion 278. The first region 256 can be provided along or otherwise be defined by an entirety of the spar 276. The second region 258 can be provided along a portion of the composite airfoil 204.

The spar 276 can extend into the interior 274. The spar 276 can be operably coupled to the trunnion 278. The trunnion 278 can include any suitable material such as, but not limited to, a metallic material or a composite material. It will be appreciated that the term composite material can further include metals with a composite architecture (e.g., a metal matrix composite). In the case of a composite material, the trunnion 278 can be any suitable composite material such as a 2D or 3D composite, a laminate skin, a woven or braided composite, or any other suitable composite.

It will be appreciated that the spar 276 can include two or more regions including respective composite plies. As a non-limiting example, the spar 276 can include two or more of the first region 256, the second region 258, or any other region.

During operation of the composite airfoil 204, the trunnion 278 can rotate about a pitch axis (Pax) in a rotational direction (Rd). As the spar 276 couples the trunnion 278 to the airfoil portion 210, rotation of the trunnion 278 in the rotational direction (Rd) causes the airfoil portion 210 to rotate about the pitch axis (Pax). This rotation can be used to control the pitch of the composite airfoil 204 such that the composite airfoil 204 is defined as a variable pitch airfoil assembly. As such, the composite airfoil 204 can be defined as a variable pitch airfoil assembly. The pitch of the composite airfoil 204 can be varied based on the operation or intended operation of the turbine engine (e.g., the turbine engine 10 of FIG. 1) in which the composite airfoil 204 is provided. The assembly 200 is adapted for a turbine engine including an external fan blade, such as, but not limited to, an unducted turbine engine.

Benefits associated with the present disclosure include a composite airfoil with an increased resilience to operational forces when compared to a conventional airfoil. As used herein, operational forces can be any force experienced along the composite airfoil during operation of the composite airfoil. The operational forces can be, but are not limited to, forces caused from the rotation of the composite airfoil, forces from a working airflow flowing against the composite airfoil, external forces applied to the composite airfoil, or a combination. It is contemplated that different regions of the composite airfoil will experience different forces during operation of the composite airfoil. As a non-limiting example, the leading edge of the composite airfoil can experience the largest axial forces as the leading edge is the first area to contact the working airflow, while the dovetail portion can experience the largest circumferential forces during rotation of the composite airfoil due to contact with opposing portions of the turbine engine.

Conventional airfoils can include a homogenous construction (e.g., formed of a single material with a single bulk modulus) or a construction including a composite material(s). In terms of the conventional airfoil including the homogenous construction, a material that is resilient to all operation forces is required. This, in turn, means that some areas of the conventional airfoil may be overly strong in order to accommodate for other areas of the conventional airfoil that will have anticipated higher operational forces. In terms of the conventional airfoil using a composite material(s), in order to reinforce certain areas of the conventional airfoil, plies are laid such that their fibers have a specific orientation to accommodate for the anticipated operational forces of the area. Each individual ply of the conventional airfoil include tows with fibers that have the same bulk modulus as one another. The composite airfoil as described herein, however, utilizes at least the first tow and the second tow to tailor the composite airfoil to ensure that each region of the airfoil is able to accommodate for the anticipated operational forces. The composite airfoil as described herein further includes a ply with tows that can have differing bulk moduli. The variation of bulk moduli within a single composite ply can be used to better tailor how the region of the airfoil will accommodate for the anticipated operational forces. Further, varying the bulk modulus between tows within a single composite ply has been found to help with minimizing flutter associated with the operation of the composite airfoil.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A composite airfoil comprising an airfoil portion having an outer wall extending between a root and a tip, and between a leading edge and a trailing edge, a composite material made from one or more composite plies, the composite material present in at least the airfoil portion of the composite airfoil, and a first composite ply of the one or more composite plies, the first composite ply including a first set of fibers, with each fiber of the first set of fibers including a first centerline axis, and a first bulk modulus, and a second set of fibers, with each fiber of the second set of fibers including a second centerline axis, and a second bulk modulus, different from the first bulk modulus.

A composite airfoil assembly comprising an airfoil portion having an outer wall extending between a root and a tip, and between a leading edge and a trailing edge, a spar, the spar extending within at least a portion of an interior of the airfoil portion and outward from the root, a composite material made from one or more composite plies, the composite material present in at least the airfoil portion of the spar, and a first composite ply of the one or more composite plies, the first composite ply including a first set of fibers, with each fiber of the first set of fibers including a first centerline axis, and a first bulk modulus, and a second set of fibers, with each fiber of the second set of fibers including a second centerline axis, and a second bulk modulus, different from the first bulk modulus.

The composite airfoil of any preceding clause, wherein the first set of fibers at least partially form a first tow, and the second set of fibers at least partially form a second tow, and the second centerline axis is non-parallel with the first centerline axis.

The composite airfoil of any preceding clause, further comprising a third set of fibers, each fiber of the third set of fibers having a third centerline axis, and a third bulk modulus that is not equal to the first bulk modulus or the second bulk modulus.

The composite airfoil of any preceding clause, wherein the first set of fibers at least partially form a first tow, the second set of fibers at least partially form a second tow, and the second centerline axis is non-parallel with the first centerline axis, and the third set of fibers at least partially form a third tow, and the third centerline axis is non-parallel to both the first centerline axis and the second centerline axis.

The composite airfoil of any preceding clause, wherein the first set of fibers and the second set of fibers are provided within a singular tow.

The composite airfoil of any preceding clause, wherein the first set of fibers and the second set of fibers are alternately spaced.

The composite airfoil of any preceding clause, wherein the second centerline axis forms a first included angle with the first centerline axis, with the first included angle having an absolute value being greater than or equal to 5 degrees and less than or equal to 60 degrees.

The composite airfoil of any preceding clause, wherein the first bulk modulus is greater than 1.05 times or less than 0.95 times the second bulk modulus.

The composite airfoil of any preceding clause, wherein the first composite ply is provided within a first region of the composite airfoil, and the composite material further comprises a second composite ply provided within a second region of the composite airfoil, the second composite ply including a third set of fibers having a third bulk modulus.

The composite airfoil of any preceding clause, wherein the first composite ply is separate from the second composite ply.

The composite airfoil of any preceding clause, wherein the first region and the second region are each provided along the outer wall.

The composite airfoil of any preceding clause, wherein the first region overlays the second region.

The composite airfoil of any preceding clause, further comprising a dovetail portion extending from the root of the airfoil portion, the composite material present in the dovetail portion with the first region being provided along the dovetail portion and the second region being provided along the airfoil portion.

The composite airfoil of any preceding clause, wherein the second composite ply is a continuation of the first composite ply, with the first composite ply not including the third set of fibers.

The composite airfoil of any preceding clause, wherein the third bulk modulus is non-equal to the first bulk modulus and the second bulk modulus.

The composite airfoil of any preceding clause, further comprising a third set of fibers including a third centerline and a third bulk modulus.

The composite airfoil of any preceding clause, wherein the second centerline axis intersects the third centerline axis at a third included angle, the third included angle having an absolute value of greater than or equal to 5 degrees and less than or equal to 60 degrees.

The composite airfoil of any preceding clause, having an absolute value being

The composite airfoil assembly of any preceding clause, further comprising a trunnion, with the spar being provided partially within the trunnion.

The composite airfoil assembly of any preceding clause, wherein the first set of fibers at least partially form a first tow, and the second set of fibers at least partially form a second tow, and the second centerline axis is non-parallel with the first centerline axis.

The composite airfoil assembly of any preceding clause, further comprising a third set of fibers, each fiber of the third set of fibers having a third centerline axis, and a third bulk modulus that is not equal to the first bulk modulus or the second bulk modulus.

The composite airfoil assembly of any preceding clause, wherein the first set of fibers at least partially form a first tow, the second set of fibers at least partially form a second tow, and the second centerline axis is non-parallel with the first centerline axis, and the third set of fibers at least partially form a third tow, and the third centerline axis is non-parallel to both the first centerline axis and the second centerline axis.

The composite airfoil assembly of any preceding clause, wherein the first set of fibers and the second set of fibers are provided within a singular tow.

The composite airfoil assembly of any preceding clause, wherein the first set of fibers and the second set of fibers are alternately spaced.

The composite airfoil assembly of any preceding clause, wherein the second centerline axis forms a first included angle with the first centerline axis, with the first included angle having an absolute value being greater than or equal to 5 degrees and less than or equal to 60 degrees.

The composite airfoil assembly of any preceding clause, wherein the first bulk modulus is greater than 1.05 times or less than 0.95 times the second bulk modulus.

The composite airfoil assembly of any preceding clause, wherein the first composite ply is provided within a first region of the composite airfoil assembly, and the composite airfoil assembly further comprises a second composite ply provided within a second region of the composite airfoil assembly, the second composite ply including a third set of fibers having a third bulk modulus.

The composite airfoil assembly of any preceding clause, wherein the first composite ply is separate from the second composite ply.

The composite airfoil assembly of any preceding clause, wherein the first region and the second region are each provided along the outer wall.

The composite airfoil assembly of any preceding clause, wherein the first region overlays the second region.

The composite airfoil assembly of any preceding clause, further comprising a dovetail portion extending from the root of the airfoil portion, the composite material present in the dovetail portion with the first region being provided along the dovetail portion and the second region being provided along the airfoil portion.

The composite airfoil assembly of any preceding clause, wherein the second composite ply is a continuation of the first composite ply, with the first composite ply not including the third set of fibers.

The composite airfoil assembly of any preceding clause, wherein the third bulk modulus is non-equal to the first bulk modulus and the second bulk modulus.

A turbine engine, comprising a fan section, a compressor section, and a turbine section in serial flow arrangement, and the composite airfoil of any preceding clause disposed in the fan section, the compressor section, or the turbine section.

The turbine engine of any preceding clause wherein the turbine engine is an unducted turbine engine and the fan section includes at least one external fan blade, with the composite airfoil being the at least one external fan blade.

The turbine engine of any preceding clause, further comprising a rotatable disk provided within one of either the compressor section or the turbine section, the rotatable disk having a slot in which a portion of the composite airfoil is receivable.

The turbine engine of any preceding clause, wherein the first set of fibers at least partially form a first tow, and the second set of fibers at least partially form a second tow, and the second centerline axis is non-parallel with the first centerline axis.

The turbine engine of any preceding clause, further comprising a third set of fibers, each fiber of the third set of fibers having a third centerline axis, and a third bulk modulus that is not equal to the first bulk modulus or the second bulk modulus.

The turbine engine of any preceding clause, wherein the first set of fibers at least partially form a first tow, the second set of fibers at least partially form a second tow, and the second centerline axis is non-parallel with the first centerline axis, and the third set of fibers at least partially form a third tow, and the third centerline axis is non-parallel to both the first centerline axis and the second centerline axis.

The turbine engine of any preceding clause, wherein the first set of fibers and the second set of fibers are provided within a singular tow.

The turbine engine of any preceding clause, wherein the first set of fibers and the second set of fibers are alternately spaced.

The turbine engine of any preceding clause, wherein the second centerline axis forms a first included angle with the first centerline axis, with the first included angle having an absolute value being greater than or equal to 5 degrees and less than or equal to 60 degrees.

The turbine engine of any preceding clause, wherein the first bulk modulus is greater than 1.05 times or less than 0.95 times the second bulk modulus.

The turbine engine of any preceding clause, wherein the first composite ply is provided within a first region of the turbine engine, and the turbine engine further comprises a second composite ply provided within a second region of the turbine engine, the second composite ply including a third set of fibers having a third bulk modulus.

The turbine engine of any preceding clause, wherein the first composite ply is separate from the second composite ply.

The turbine engine of any preceding clause, wherein the first region and the second region are each provided along the outer wall.

The turbine engine of any preceding clause, wherein the first region overlays the second region.

The turbine engine of any preceding clause, further comprising a dovetail portion extending from the root of the airfoil portion, with the first region being provided along the dovetail portion and the second region being provided along the airfoil portion.

The turbine engine of any preceding clause, wherein the second composite ply is a continuation of the first composite ply, with the first composite ply not including the third set of fibers.

The turbine engine of any preceding clause, wherein the third bulk modulus is non-equal to the first bulk modulus and the second bulk modulus.

What is claimed is:

1. A composite airfoil comprising:

an airfoil portion having an outer wall extending between a root and a tip and between a leading edge and a trailing edge;

a composite material made from one or more composite plies, the composite material present in at least the airfoil portion of the composite airfoil;

a first composite ply of the one or more composite plies, the first composite ply being provided within a first region of the composite airfoil, the first composite ply including:

a first set of fibers, with each fiber of the first set of fibers including a first centerline axis and a first bulk modulus; and a second set of fibers, with each fiber of the second set of fibers including a second centerline axis and a second bulk modulus, different from the first bulk modulus; and a second composite ply of the one or more composite plies, the second composite ply being provided with a second region of the composite airfoil, the second composite ply including:

a third set of fibers having a third bulk modulus.

2. The composite airfoil of claim 1, wherein:

the first set of fibers at least partially form a first tow; and the second set of fibers at least partially form a second tow, and the second centerline axis is non-parallel with the first centerline axis.

3. The composite airfoil of claim 1, wherein the first set of fibers and the second set of fibers are provided within a singular tow.

4. The composite airfoil of claim 3, wherein the first set of fibers and the second set of fibers are alternately spaced.

5. The composite airfoil of claim 1, wherein the second centerline axis forms a first included angle with the first centerline axis, with the first included angle having an absolute value being greater than or equal to 5 degrees and less than or equal to 60 degrees.

6. The composite airfoil of claim 1, wherein the first composite ply is separate from the second composite ply.

7. The composite airfoil of claim 1, wherein the first region and the second region are each provided along the outer wall.

8. The composite airfoil of claim 1, wherein the first region overlays the second region.

9. The composite airfoil of claim 1, further comprising a dovetail portion extending from the root of the airfoil portion, the composite material present in the dovetail portion with the first region being provided along the dovetail portion and the second region being provided along the airfoil portion.

10. The composite airfoil of claim 1, wherein the second composite ply is a continuation of the first composite ply, with the first composite ply not including the third set of fibers.

11. The composite airfoil of claim 10, wherein the third bulk modulus is non-equal to the first bulk modulus and the second bulk modulus.

12. An assembly including the composite airfoil of claim 1, further comprising a spar, the spar extending within at least a portion of an interior of the airfoil portion and outward from the root, the composite material present in the spar, wherein:

the first composite ply is provided within the first region along the spar; and the second composite ply of the one or more composite plies provided within a second region along the airfoil portion, the second composite ply including a third set of fibers having a third bulk modulus.

13. The assembly of claim 12, further comprising a trunnion, with the spar being provided partially within the trunnion.

14. A turbine engine, comprising:

a fan section, a compressor section, and a turbine section in serial flow arrangement; and the composite airfoil of claim 1 disposed in the fan section, the compressor section, or the turbine section.

15. The turbine engine of claim 14, wherein the turbine engine is an unducted turbine engine and the fan section includes at least one external fan blade, with the composite airfoil being the at least one external fan blade.

16. The turbine engine of claim 14, further comprising a rotatable disk provided within one of either the compressor section or the turbine section, the rotatable disk having a slot in which a portion of the composite airfoil is receivable.

17. A composite airfoil comprising:

an airfoil portion having an outer wall extending between a root and a tip and between a leading edge and a trailing edge;

a composite material made from one or more composite plies, the composite material present in at least the airfoil portion of the composite airfoil;

a first composite ply of the one or more composite plies, the first composite ply including:

a first set of fibers, with each fiber of the first set of fibers including a first centerline axis and a first bulk modulus;

a second set of fibers, with each fiber of the second set of fibers including a second centerline axis and a second bulk modulus, different from the first bulk modulus; and a third set of fibers, each fiber of the third set of fibers having a third centerline axis and a third bulk modulus that is not equal to the first bulk modulus or the second bulk modulus.

18. The composite airfoil of claim 17, wherein:

the first set of fibers at least partially form a first tow;

the second set of fibers at least partially form a second tow, and the second centerline axis is non-parallel with the first centerline axis; and the third set of fibers at least partially form a third tow, and the third centerline axis is non-parallel to both the first centerline axis and the second centerline axis.

19. The composite airfoil of claim 17, wherein the first bulk modulus is greater than 1.05 times or less than 0.95 times the second bulk modulus.

20. The composite airfoil of claim 17, wherein the first composite ply is provided within a first region of the composite airfoil, and the composite material further comprises a second composite ply provided within a second region of the composite airfoil.

* * * * *